US006578387B2

(12) United States Patent
Tankala

(10) Patent No.: US 6,578,387 B2
(45) Date of Patent: *Jun. 17, 2003

(54) METHOD OF FABRICATION OF RARE EARTH DOPED PREFORMS FOR OPTICAL FIBERS

(75) Inventor: Kanishka Tankala, Southbridge, MA (US)

(73) Assignee: Fitel USA Corp., Norcross, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/492,925

(22) Filed: Jan. 28, 2000

(65) Prior Publication Data

US 2003/0024275 A1 Feb. 6, 2003

Related U.S. Application Data

(60) Provisional application No. 60/128,488, filed on Apr. 9, 1999.

(51) Int. Cl.[7] .............................................. C03B 37/018
(52) U.S. Cl. ............................. 65/390; 65/399; 65/426; 65/417
(58) Field of Search .......................... 65/399, 390, 417, 65/426

(56) References Cited

U.S. PATENT DOCUMENTS

| 4,338,111 A | * | 7/1982 | Edahiro et al. ............... 65/426 |
| 5,047,076 A | * | 9/1991 | Cognolato et al. ......... 65/30.13 |
| 5,151,117 A | * | 9/1992 | Bartholomew et al. ....... 501/37 |
| 5,196,383 A | * | 3/1993 | Ito et al. ........................ 501/12 |
| 5,474,588 A | * | 12/1995 | Tanaka et al. ................ 65/390 |
| 5,679,125 A | * | 10/1997 | Hiraiwa et al. ............... 65/17.3 |
| 6,109,065 A | * | 8/2000 | Atkins et al. .................. 65/399 |
| 6,192,713 B1 | * | 2/2001 | Zhang et al. .................. 65/388 |

FOREIGN PATENT DOCUMENTS

| EP | 0 451 293 A1 | 10/1991 |
| EP | 0 466 932 A1 | 1/1992 |
| WO | WO 00/00442 | 1/2000 |

* cited by examiner

Primary Examiner—John Hoffmann
(74) Attorney, Agent, or Firm—Law Office of Leo Zucker

(57) ABSTRACT

The present invention discloses a method of fabricating rare earth-doped preforms for optical fibers. A silica soot is deposited as a layer with high porosity on an inner surface of a silica-based tube by a modified chemical vapor deposition (MCVD) process at a temperature high enough to produce the silica soot but low enough to avoid sintering of the soot into the silica-based tube. The silica-based tube is then immersed in a solution including a rare earth element and a codopant element for impregnation. The excess solution is drained and the silica-based tube is dried in a stream of chlorine and inert gas at an elevated temperature. Then, the rare earth element and the codopant element are oxidized under an oxygen partial pressure at a temperature high enough to overcome kinetic limitations against oxidation. Finally, the soot layer is consolidated while flowing a mixture of chlorides of a second codopant element and oxygen at a sintering temperature at which the second codopant element reacts with oxygen to form codopant oxide which is delivered around the rare earth element oxide deposited in the soot layer. In the method of the current invention, one or more rare earth elements are codoped with preferred codopants including but not limited to Ge, Al, P and/or B to enhance the performance of the rare earth ions. Other dopants may also be used in conjunction with the preferred dopants for modifying the refractive index of the core.

20 Claims, 2 Drawing Sheets

METHOD OF FABRICATION OF RARE EARTH DOPED PREFORMS FOR OPTICAL FIBERS

RELATED APPLICATIONS

The present application claims the priority of U.S. provisional patent application No. 60/128,488, entitled "Method of Fabrication of Rare Earth Doped Preforms," filed on Apr. 9, 1999.

FIELD OF THE INVENTION

The invention relates to rare earth doped optical fibers for use as fiber lasers, fiber amplifiers and super-fluorescent sources. More particularly, the invention relates to a method for fabrication of a preform in which its core is doped with rare earth elements along with certain preferred codopants.

BACKGROUND OF THE INVENTION

When an optical fiber in which its core is doped with rare earth ions is pumped with radiation of a certain wavelength, the rare earth ions absorb the pump energy and subsequently emit radiation with wavelengths different from that of the pump radiation. This property of the rare earth ion has been utilized in making fiber lasers and amplifiers. Laser transitions are achieved over a wide range of wavelengths by incorporating an appropriate choice of rare earth dopants into host glass composition. A variety of rare earth ions including Nd, Er, Yb, Ho, Pr, Eu, Ce, Dy, Sm, Tb, Gd, Pm and Tm have been shown to provide useful laser actions.

Numerous methods have been developed in the prior art to incorporate rare earth ions into silica glass. These methods include solution-doping (See, e.g., Townsend et al., "Solution doping technique for fabrication of rare earth doped fibers," Electron. Lett., 23(7):329, 1987; Tanaka, "Solution doping of a silica," U.S. Pat. No. 5,474,588; Tanaka, "Erbium-doped silica optical fiber preform," U.S. Pat. No. 5,526,459; Cognolato, "Method of fabricating optical fibers by solution doping, U.S. Pat. No. 5,047,076), sol-gel (See, e.g., DiGiovanni et al., "A new optical fiber fabrication technique using sol-gel dip coating," Proceedings of OFC, vol. 4, paper WA2, 1991), aerosol (See, e.g., Morse et al., "Aerosol techniques for fiber core doping," Proceedings of OFC, vol. 4, paper WA3, 1991) and vapor phase techniques (See, e.g., Poole et al., "Fabrication of low loss optical fibers containing rare earth ions," Electron. Lett., 21(17):737, 1985; MacChesney et al., "Multiconstituent optical fiber," U.S. Pat. No. 4,666,247; Tuminelli et al., "Fabrication of high concentration rare earth doped optical fibers using chelates," J. Lightwave Tech., 8(11):1680, 1990).

It is known that the incorporation of certain modifiers or codopants in the proximity of the rare earth ions in the core can alleviate some deleterious effects on the emission of radiation with a desired wavelength and enhance the highly efficient conversion of the pump radiation to radiation of desired wavelength. These codopants include but not restricted to Al, P, Ge and B.

Although the beneficial effects of the preferred codopants and their presence in a close proximity of the rare earth ion have been well known, no attempt has been made to deliver the codopants preferentially to the close proximity of the rare earth ions. In the conventional doping methods, the rare earth element and preferred codopants are uniformly incorporated into a preform and their relative locations with respect to each other are usually dependent on a natural diffusion process, which occurs in the condensed phase and is very slow.

In addition, although it is necessary for a rare earth element and a preferred codopant to have certain minimum concentrations to manifest their effective performance, methods to control independently a final concentration of each element in a preform to maximize their effects have not been available. For example, in prior art, P (or B) doping would be achieved by adding $POCl_3$ (or $BCl_3$) to the stream of $SiCl_4$ used to form the soot layer. This puts severe limitations on the porosity and amount of soot that is generated and consequently affects the amount of rare earth and codopant that can be incorporated. When a P (or B) doped soot is deposited, the soot tends to sinter at low temperatures. Such sintering reduces the porosity of the soot and, hence, the soot's ability to absorb the solution with the rare earth and codopant compounds. The temperature of the soot deposition can be reduced to increase the porosity. However, it was found that to achieve the desired amount of P the deposition temperature has to be reduced to an extent to which soot generation ceases. Thus, the methods of prior art cannot provide the means for incorporating rare earth elements and codopants at desired high levels, respectively.

SUMMARY OF INVENTION

The present invention provides a method to fabricate a rare earth-doped preform for an optical fiber.

According to one aspect of the invention, a porous silica soot layer is deposited on an inner surface of a silica-based substrate tube at a deposition temperature. The porous silica soot layer is immersed in an impregnation solution having at least one rare earth element and one codopant element to preferentially deliver the codopant element to the close proximity of the rare earth element on the porous silica soot layer. The porous silica soot layer is dried from the impregnation solution with a stream of chlorine and inert gas at an elevated temperature. The rare earth element and the codopant element is oxidized at an oxidation temperature to form a rare earth element oxide and a codopant element oxide. Finally, the porous silica soot layer is sintered into a glass layer.

The porous silica soot layer is deposited by a modified chemical vapor deposition process at a deposition temperature from about 1300° C. to about 1800° C. with a preferable deposition temperature at about 1600° C. The rare earth element has an atomic number of 57 through 71 such as Yb, Nd, and Er. The rare earth element is used in the form of a water or alcohol soluble compound such as chloride or nitrate to prepare the impregnation solution. The rare earth chloride used in the preferred embodiments is $YbCl_3 \cdot 6H_2O$, $NdCl_3 \cdot 6H_2O$, or $ErCl_3 \cdot 6H_2O$. The codopant element is used to promote the solubility of the rare earth element or to modify the phonon energy of the silica soot layer. The codopant element includes Al, P, Ge and B, preferably in the form of soluble compound such as chloride in the case of aluminum. The duration for the immersing step is set long enough so that the porous silica soot layer is saturated with the impregnation solution. A typical duration is at least 0.5 hour, preferably about 1 hour. In a preferred embodiment, the porous silica soot layer is dried from the impregnation solution first with a stream of inert gas and subsequently with a stream of chlorine and inert gas at an elevated temperature. The duration for the first drying step ranges from about 0.5 hour to about 1 hour. The temperature for the second drying step ranges from 600° C. to 1200° C., preferably 800–1000° C. The oxidation temperature ranges from 600° C. to 1000° C.

In a preferred embodiment, a mixture of a second codopant precursor and oxygen is flown over the porous silica soot layer during said sintering step. The second codopant precursor is a chloride selected from the group consisting of $POCl_3$, $GeCl_4$ and $BCl_3$. The sintering step is conducted at a temperature between about 1500° C. and about 2000° C., preferably at a temperature of about 1800° C.

According to another aspect of the invention, a porous silica soot layer is deposited on an inner surface of a silica-based substrate tube at a deposition temperature. The porous silica soot layer is immersed in an impregnation solution having at least one rare earth element. The porous silica soot layer is dried from the impregnation solution with a stream of chlorine and inert gas at an elevated temperature. The rare earth element is oxidized at an oxidation temperature to form a rare earth element oxide. The porous silica soot layer is sintered with a mixture of a codopant precursor and oxygen wherein the codopant precursor becomes a codopant oxide which is preferentially delivered to the close proximity of the rare earth oxide on the porous silica soot layer.

The porous silica soot layer is deposited by a modified chemical vapor deposition process at the deposition temperature from about 1300° C. to about 1800° C., preferably at about 1600° C. The rare earth element has an atomic number of 57 through 71 such as Yb, Nd, and Er. The rare earth element is used in the form of a soluble compound such as chloride or nitrate. The rare earth chloride used in the preferred embodiments is $YbCl_3.6H_2O$, $NdCl_3.6H_2O$, or $ErCl_3.6H_2O$. The duration for the immersing step is set long enough so that the porous silica soot layer is saturated with the impregnation solution. A typical duration is at least 0.5 hour, preferably about 1 hour. In a preferred embodiment, the porous silica soot layer is dried from the impregnation solution first with a stream of inert gas and then with a stream of chlorine and inert gas at an elevated temperature. The duration for the first drying step ranges from about 0.5 hour to about 1 hour. The temperature for the second drying step ranges from 600° C. to 1200° C., preferably 800–1000° C. The oxidation temperature ranges from 600° C. to 1000° C. The codopant precursor is a chloride selected from the group consisting of $POCl_3$, $GeCl_4$ and $BCl_3$. The codopant element is used to promote the solubility of the rare earth element or to modify the phonon energy of the silica soot layer. The sintering step is conducted at a temperature between about 1500° C. and about 2000° C., preferably at a temperature of about 1800° C.

In a preferred embodiment, the impregnation solution further comprises a codopant element to further promote the solubility of the rare earth element. The codopant element includes Al, P, Ge and B, preferably in the form of water or alcohol soluble compounds such as chloride.

DETAILED DESCRIPTION OF THE INVENTION

The present invention discloses a method for preferentially delivering the desired codopants to a close proximity of rare earth ions so that highly efficient energy conversion can be achieved. The invention also allows an independent control of the concentration of rare earth element and those of preferred codopants, and facilitates the incorporation of high levels of dopants to further enhance the efficiency of energy conversion. These advantages are achieved by uncoupling the silica soot deposition step from the dopant incorporation steps so that the deposition of pure silica produces an excellent porosity, which, in turn, allows the incorporation of high amounts of dopants and codopants.

The present invention discloses a method of fabricating rare earth-doped preforms for optical fibers. A silica soot is deposited as a layer with high porosity on an inner surface of a silica-based tube by a modified chemical vapor deposition (MCVD) process at a temperature high enough to produce the silica soot but low enough to avoid sintering of the soot into the silica-based tube. The silica-based tube is then immersed in a solution including a rare earth element and a codopant element for impregnation. The excess solution is drained and the silica-based tube is dried first in a stream of inert gas and subsequently in a stream of chlorine and inert gas at an elevated temperature. Then, the rare earth element and the codopant element are oxidized under an oxygen partial pressure at a temperature high enough to overcome kinetic limitations against oxidation. Finally, the soot layer is consolidated while flowing a mixture of chlorides of a second codopant compound and oxygen at a sintering temperature at which the second codopant compound reacts with oxygen to form codopant oxide which is delivered around the rare earth element deposited in the soot layer. In the method of the current invention, one or more rare earth elements are codoped with preferred codopants including but not limited to Ge, Al, P and/or B to enhance the performance of the rare earth ions. Other dopants may also be used in conjunction with the preferred dopants for modifying the refractive index of the core.

Figure 1:
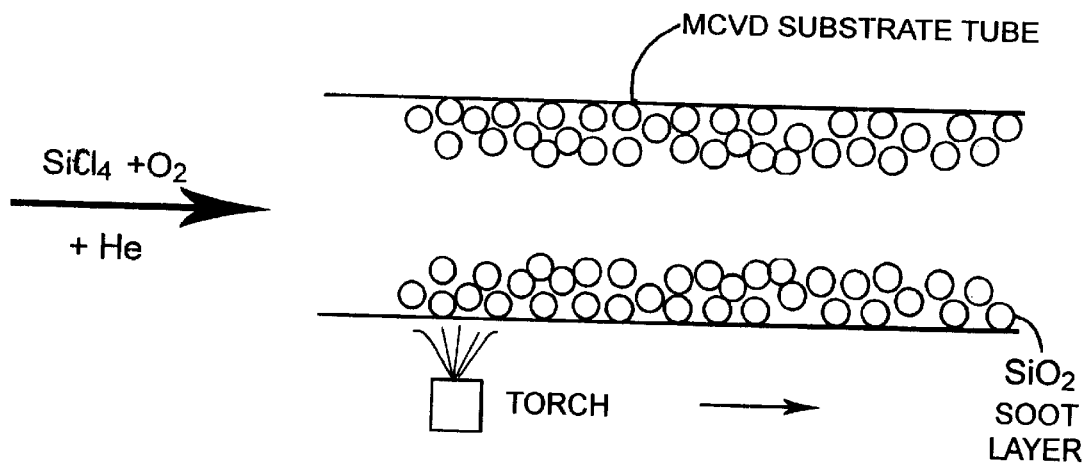
FIG. 1 is a schematic illustration of a deposition of a porous silica soot layer according to the invention.

The present invention is now described in detail with reference to the accompanying figures. At the first step, a silica soot layer is deposited on the inner surface of a silica-based substrate tube by an MCVD process as shown in FIG. 1 under conditions where the silica soot layer does not sinter into a layer of glass. Rather, the silica soot layer is deposited in such a way that it has substantial porosity (i.e., low density) to enable the subsequent doping solution to penetrate into the silica soot layer. There is a window of acceptable soot density. If the soot density is too low, the silica soot layer does not have adequate strength to withstand a subsequent solution impregnation step and tends to flake. On the other hand, if the density is too high, the silica soot layer is not able to let the impregnation solution penetrate into the entire layer which would result in superficially uniform doping. Thus, the soot density is one of the important parameters for controlling the dopant concentration in the final product.

One of the processing parameters that can be used to vary the soot density is the deposition temperature. The higher the soot deposition temperature, the greater the degree of sintering and the higher the soot density. In general, the deposition temperature in the invention ranges from about 1300° C. and about 1800° C., and preferably at 1600° C.

Figure 2:
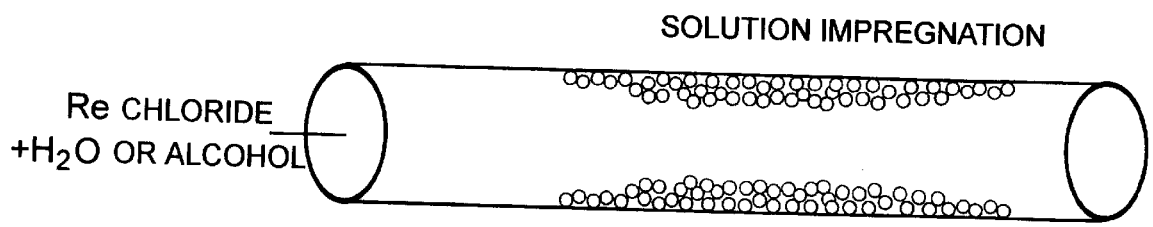
FIG. 2 is a schematic illustration of a solution impregnation of the porous silica soot layer according to the invention.

The silica-based substrate tube with the porous silica soot layer is then immersed into a premixed solution comprising a rare earth compound(s) as shown in FIG. 2. To prepare the rare earth-containing solution, one or more rare earth compounds, including but not limited to chlorides and nitrates, are dissolved into an aqueous or alcoholic solution. Among the rare earth elements of atomic numbers 57 through 71, Yb, Nd and Er are the most common rare earth elements used in the present invention. For example, chlorides of these elements (or other soluble compounds of these elements), $YbCl_3.6H_2O$, $NdCl_3.6H_2O$, and $ErCl_3.6H_2O$, alone or in combination, are dissolved in ethanol (or other alcohol or water) at the concentrations between about 0.1 and about 30 g/L.

The preferred codopants that are to be delivered in close proximity to the rare earth element include but are not limited to Al, P, Ge and B. The addition of these codopants is essential to promote the solubility of the rare earth element which typically has limited miscibility in silica glass and/or to modify the local phonon energy of the glass. In one example, aluminum codoping is achieved by dissolving water or alcohol soluble compound, such as $AlCl_3.6H_2O$ or $Al(NO_3)_3.9H_2O$, at a concentration between about 0.5 and about 200 g/L in the aqueous or alcoholic solution containing the rare earth compound(s).

The immersion duration of the substrate tube is set long enough so that the porous silica soot layer becomes saturated with the impregnation solution. The immersion duration is usually from at least about 0.5 hour, and preferably 1 hour. The immersion duration may be varied to obtain different concentrations of the dopants in the silica soot layer.

After the silica soot layer is saturated with the solution, the excess solution is drained and the silica soot layer is dried with a stream of inert gas such as nitrogen and subsequently with a stream of chlorine and inert gas at an elevated temperature. The elevated temperature ranges from 600° C. to 1200° C., preferably 800–1000° C. If this step is not carried out in the case where alcohol is used as the solution, the alcohol could potentially ignite during the subsequent oxidation step and leave a carbon residue in the preform. The duration of the first drying step is typically around 0.5 to 1 hour. This however depends on the thickness of the silica soot layer and its density and the type of alcohol used for the solution. Now the soot is impregnated with both the rare earth element and the codopant element with the latter being preferentially located in close proximity of the former. Other rare earth elements can be doped with the preferred codopants in a similar fashion.

Figure 3:
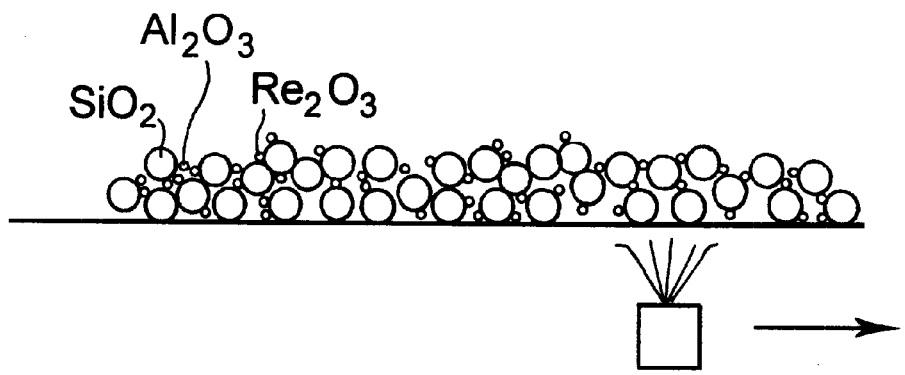
FIG. 3 is a schematic illustration of an oxidation of a rare earth element and a codopant element in the silica soot layer according to the invention.

On evaporation of the alcohol, the rare earth and the rare element in chloride form remain in pores of the porous silica soot layer. These chlorides need to be oxidized before the soot layer is sintered. This is achieved in the oxidation step as shown in FIG. 3. The substrate tube is mounted on a MCVD lathe and oxidation is carried out under an oxygen partial pressure of one atmosphere. The oxidation of rare earth and codopant chlorides can occur at fairly low temperatures. However, a certain minimum oxidation temperature needs to be maintained to overcome any kinetic limitations. The typical oxidation temperature ranges from about 600° C. to about 1000° C. Care should be taken to avoid using excessive temperatures for oxidation. The chlorides have a significantly higher vapor pressure than the oxides and can be volatilized and lost during this step. This volatilization can be minimized by choosing as low an oxidation temperature as possible.

Figure 4:
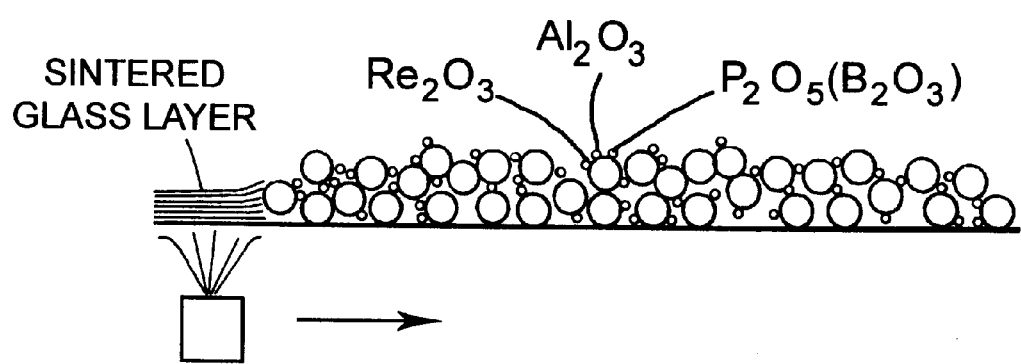
FIG. 4 is a schematic illustration of a sintering process of the silica soot layer according to the invention.

Other codopants may also be incorporated into the silica soot layer during the sintering step in which the porous soot layer with the soot particles coated with rare earth and codopant oxides is sintered into a glass layer to form an optical fiber preform. This sintering step (also referred to as soot consolidation) is carried out while flowing a mixture of gaseous codopant precursors and oxygen as shown in FIG. 4. The gaseous codopant precursors can be in the form of chlorides. For example, $POCl_3$ and/or $GeCl_4$ and/or $BCl_3$ are used in a preferred example. The carrier gas flows through the $POCl_3$ bubbler and is maintained between about 5 and about 300 sccm. In another example, aluminum codopant may also be achieved by flowing $AlCl_3$ along with oxygen during sintering rather than using an impregnation solution with an aluminum compound. The sintering temperature ranges from about 1500° C. to about 2000° C. and preferably at around 1800° C. At the sintering temperature, $POCl_3$ (and/or $GeCl_4$ and/or $BCl_3$) reacts with oxygen to form $P_2O_5$ (and/or $GeO_2$ and/or $B_2O_3$). These oxides are once again delivered around the rare earth element before the porous layer is consolidated into a dense glass layer. Thus the preform fabricated in this manner has the preferred codopants delivered in close proximity of the rare earth element(s).

This delivery method of the codopants also alleviates limitations on the amount of codopants that can be incorporated into the glass. The amount of codopants needed depends on the concentration of rare earth that is desired in the fiber. The higher the concentration, the shorter the length of the fiber that will provide the needed energy conversion, provided that the local environment around the rare earth is appropriate. To ensure that the rare earth has the right local environment, higher concentrations of the preferred codopants are needed as the rare earth concentration is increased.

With regard to aluminum as a codopant, its concentration in the soot layer can be increased for example by dissolving additional amount of aluminum compound in the impregnation solution. However, beyond a certain concentration, aluminum starts to separate from the soot layer as crystallites (devitrification) and causes scattering. This can be alleviated if the preform is codoped with P. Accordingly, a substantial amount of P codoping is needed not only to improve the performance of the rare earth ions in the glass but also to ensure that the high level of Al dopant will not lead to devitrification.

After the consolidation step, the preform is collapsed as standard MCVD preform. The collapse temperatures are adjusted to minimize the non-circularity of the core and can be raised up to about 2300° C. The high temperatures used for preform collapse pose a significant problem in terms of dopant volatilization via halogenation. This could lead to significant radial non-uniformity in dopant distribution. The dopant volatilization may be suppressed by using methods known to those skilled in the art.

The present invention can be further understood through the following embodiments.

Embodiment 1: Ytterbium (Yb)-doped Preforms

A silica soot layer is deposited at a temperature ranging from 1300° C. to 1800° C., preferably at 1600° C. An impregnation solution is prepared by dissolving $YbCl_3.6H_2O$ and $AlCl_3.6H_2O$ (or other soluble Yb and Al compounds) in ethanol (or other alcohol or water) ranging from 0.5 to 30 g/L, preferably at 10 g/L and 0.5 to 150 g/L, preferably at 40 g/L, respectively. The soot layer is impregnated with the solution and is subsequently dried preferably in a chlorine atmosphere. The $YbCl_3.6H_2O$ and $AlCl_3.6H_2O$ are oxidized on the soot layer. The soot layer is then sintered at a temperature ranging from 1500° C. to 2000° C., preferably at 1800° C. in a $POCl_3$ environment. The carrier gas flow to the $POCl_3$ bubbler is maintained at 5 to 200 sccm, preferably at 60 sccm, to deliver $POCl_3$. The fiber made from the preform has a numerical aperture ranging from 0.07 to 0.25 with a typical number of 0.1 with a core diameter ranging from 3 to 11 μm with a typical diameter of 8.0 μm.

The preform is drawn so that the fiber can be core pumped or clad pumped with suitable pump radiation that is absorbed by the Yb ions. The pump wavelength of 915 nm is used in one example. The fiber thus made has exhibited near theoretical quantum efficiencies.

Embodiment 2: Neodymium (Nd)-doped Preforms

A silica soot layer is deposited at a temperature ranging from 1300° C. to 1800° C., preferably at 1600° C. An impregnation solution is prepared by dissolving $NdCl_3.6H_2O$ and $AlCl_3.6H_2O$ (or other soluble Nd and Al compounds) in ethanol (or other alcohol or water) ranging from 0.5 to 30 g/L, preferably at 7 g/L and 0.5 to 150 g/L, preferably at 27 g/L, respectively. The soot layer is impregnated with the solution and is subsequently dried preferably in a chlorine atmosphere. The $NdCl_3.6H_2O$ and $AlCl_3.6H_2O$ are oxidized. The soot layer is then sintered at a temperature ranging from 1600° C. to 2000° C., preferably at 1800° C. in a $POCl_3$ environment. The carrier gas flow to the $POCl_3$ bubbler is maintained at 5 to 300 sccm, preferably at 45 sccm, to deliver $POCl_3$. The fiber made from the preform has a numerical aperture ranging from 0.07 to 0.25 with a typical number of 0.1 with a core diameter ranging from 3 to 10 μm with a typical diameter of 6.5 μm. The preform is drawn so that the fiber can be core pumped or clad pumped with suitable pump radiation that is absorbed by the Nd ions. The pump wavelength of 834 nm is used in one example. The fiber thus made has exhibited near theoretical quantum efficiencies.

Embodiment 3: Erbium (Er)-doped Preforms

A silica soot layer is deposited at a temperature ranging from 1300° C. to 1800° C., preferably at 1600° C. An impregnation solution is prepared by dissolving $ErCl_3.6H_2O$ and $AlCl_3.6H_2O$ (or other soluble Er and Al compounds) in ethanol (or other alcohol or water) ranging from 0.1 to 3 g/L, preferably at 0.5 g/L and 5 to 200 g/L, preferably at 100 g/L, respectively. The soot layer is impregnated with the solution and is subsequently dried preferably in a chlorine atmosphere. The $ErCl_3.6H_2O$ and $AlCl_3.6H_2O$ are oxidized. The soot layer is then sintered at a temperature ranging from 1500° C. to 2000° C. in a $POCl_3$ and/or $GeCl_4$ environment. The carrier gas flow to $POCl_3$ and/or $GeCl_4$ bubbler is maintained at 5 to 150 sccm, preferably at 40 sccm and 0 to 300 sccm, preferably at 60 sccm, to deliver $POCl_3$ and $GeCl_4$, respectively. The fiber made from the preform has a numerical aperture ranging from 0.13 to 0.35 with a typical number of 0.2 with a core diameter ranging from 2 to 9 μm with a typical diameter of 3.4 μm. The preform is drawn so that the fiber can be core pumped with suitable pump radiation that is absorbed by the Er ions. The pump wavelength of 980 nm or 1480 nm is used in one example. The fiber thus made has exhibited near theoretical quantum efficiencies.

Embodiment 4: Erbium/Ytterbium (Er/Yb) Co-doped Preforms

The method of the invention may also be used to make preforms whose core is doped with more than one rare earth dopant. Such codoping of rare earth elements allows for novel pumping schemes and alleviates certain difficulties faced with directly pumping certain rare earth ions. In this method a first rare earth is co-doped with a second rare earth which can easily absorb a pump radiation. The co-doped fiber is pumped with radiation that is easily absorbed by the second rare earth. The second rare earth converts this energy into a radiation that is easily absorbed by the first rare earth, which in turn emits the desired radiation for laser action or signal amplification. With an appropriate ratio of the two rare earth ions and a suitable host glass composition, an efficient fiber laser/amplifier can be made.

One such example is Er/Yb co-doped fiber.

A silica soot layer is deposited at a temperature ranging from 1300° C. to 1800° C., preferably at 1600° C. An impregnation solution is prepared by dissolving $YbCl_3.6H_2O$, $ErCl_3.6H_2O$ and $AlCl_3.6H_2O$ (or other soluble Yb, Er and Al compounds) in ethanol (or other alcohol or water) ranging from 0.5 to 30 g/L, preferably at 10 g/L and 0.05 to 3 g/L, preferably at 0.5 g/L, and 0.5 to 15 g/L, preferably 30 g/L, respectively. The $YbCl_3.6H_2O$, $ErCl_3.6H_2O$ and $AlCl_3.6H_2O$ are oxidized. The soot layer is impregnated with the solution and is subsequently dried preferably in a chlorine atmosphere. The soot layer is then sintered at a temperature ranging from 1500° C. to 2000° C., preferably at 1800° C. in a $POCl_3$ environment. The carrier gas flow to the $POCl_3$ bubbler is maintained at 5 to 300 sccm, preferably at 60 sccm, to deliver $POCl_3$. The fiber made from the preform has a numerical aperture ranging from 0.07 to 0.25 with a typical number of 0.12 with a core diameter ranging from 3 to 11 μm with a typical diameter of 6.0 μm. The preform is drawn so that the fiber can be core pumped or clad pumped with suitable pump radiation that is absorbed by the Yb ions. The pump wavelength of 1064 nm is used in one example. The fiber thus made has exhibited good quantum efficiencies.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method of fabricating a preform for an optical fiber, comprising:

depositing a silica soot layer on an inner surface of a substrate tube at a deposition temperature ranging from about 1300 degrees C. to about 1800 degrees C. to obtain a desired porosity for the soot layer;

preparing an alcoholic impregnation solution containing at least a first rare earth element, and at least a first codopant element selected to enhance performance of the rare earth doped core in the drawn optical fiber;

immersing the substrate tube with the deposited silica soot layer on the inside surface in the impregnation solution for a time sufficient to allow the soot layer to become saturated with the impregnation solution;

drying the saturated soot layer for at least a time sufficient to evaporate and prevent ignition of alcohol in the impregnation solution, including drying the soot layer with a stream of chlorine and an inert gas at a temperature ranging from about 600 degrees C. to about 1200 degrees C.;

oxidizing the first rare earth element and the first codopant element in the soot layer after performing the drying step, under an oxygen partial pressure of about one atmosphere and at an oxidizing temperature ranging from about 600 degrees C. to about 1000 degrees C.;

sintering the soot layer into a glass layer on the inside surface of the substrate tube in an atmosphere including oxygen and at a sintering temperature ranging from about 1500 degrees C. to about 2000 degrees C.; and flowing a mixture of a second codopant element and oxygen over the silica soot layer on the substrate tube during said sintering step, thus forming an oxide of the second codopant element in close proximity to the oxidized first rare earth element in the soot layer.

2. The method of fabricating a preform for an optical fiber according to claim 1, wherein the silica soot layer depositing step is performed by a modified chemical vapor deposition (MCVD) process.

3. The method of fabricating a preform for an optical fiber according to claim 1, including selecting an element having an atomic number between 57 and 71, inclusive, as the first rare earth element.

4. The method of claim 3, wherein the selected first rare earth is Yb.

5. The method of claim 3, wherein the selected first rare earth is Nd.

6. The method of claim 3, wherein the selected first rare earth is Er.

7. The method of fabricating a preform for an optical fiber according to claim 1, including selecting the first rare earth element in the form of an alcohol soluble compound.

8. The method of claim 7, wherein the selected alcohol soluble compound is a chloride.

9. The method of claim 8, wherein the selected chloride is $YbCl_3 \cdot 6H_2O$.

10. The method of fabricating a preform for an optical fiber according to claim 1, including selecting the first codopant element for promoting solubility of said first rare earth element.

11. The method of fabricating a preform for an optical fiber according to claim 1, including selecting said first codopant element for modifying phonon energy of the silica soot layer deposited on the substrate tube.

12. The method of fabricating a preform for an optical fiber according to claim 1, including selecting the first codopant element as Al.

13. The method of fabricating a preform for an optical fiber according to claim 1, including selecting the first codopant element in the form of an alcohol soluble compound.

14. The method of claim 13, including selecting the alcohol soluble compound as $AlCl_3 \cdot 6H_2O$.

15. The method of fabricating a preform for an optical fiber according to claim 1, including setting the duration of the immersing step at a minimum of 0.5 hour.

16. The method of claim 15, wherein the duration for the immersing step is set at about 1 hour.

17. The method of fabricating a preform for an optical fiber according to claim 1, including dissolving the first rare earth element and the first codopant element in ethanol to form the alcoholic impregnation solution.

18. The method of fabricating a preform for an optical fiber according to claim 1, wherein said drying step includes supplying nitrogen as the inert gas.

19. The method of claim 1, including selecting the second codopant element in the form of a chloride selected from the group including $POCl_3$, $GeCl_4$ and $BCl_3$.

20. A method of fabricating a preform for an optical fiber, comprising:

depositing a silica soot layer on an inner surface of a substrate tube at a deposition temperature of about 1600 degrees C. to obtain a desired porosity for the soot layer;

preparing an alcoholic impregnation solution containing at least a first rare earth element, and at least a first codopant element selected to enhance performance of the rare earth doped core in the drawn optical fiber;

immersing the substrate tube with the deposited silica soot layer on the inside surface in the impregnation solution for a time sufficient to allow the soot layer to become saturated with the impregnation solution;

drying the saturated soot layer for at least a time sufficient to evaporate and prevent ignition of alcohol in the impregnation solution, including drying the soot layer with a stream of chlorine and an inert gas at a temperature ranging from about 600 degrees C. to about 120 degrees C.;

oxidizing the first rare earth element and the first codopant element in the soot layer after performing the drying step, under an oxygen partial pressure of about one atmosphere and at an oxidizing temperature ranging from about 600 degrees C. to about 1000 degrees C.;

sintering the soot layer into a glass layer on the inside surface of the substrate tube in an atmosphere including oxygen and at a sintering temperature ranging from about 1500 degrees C. to about 2000 degrees C.; and flowing a mixture of a second codopant element and oxygen over the silica soot layer on the substrate tube during said sintering step, thus forming an oxide of the second codopant element in close proximity to the oxidized first rare earth element in the soot layer.

* * * * *